July 10, 1951  R. W. FERNSTRUM  2,560,098
CUSHION MOUNTING DEVICE
Filed Jan. 5, 1946
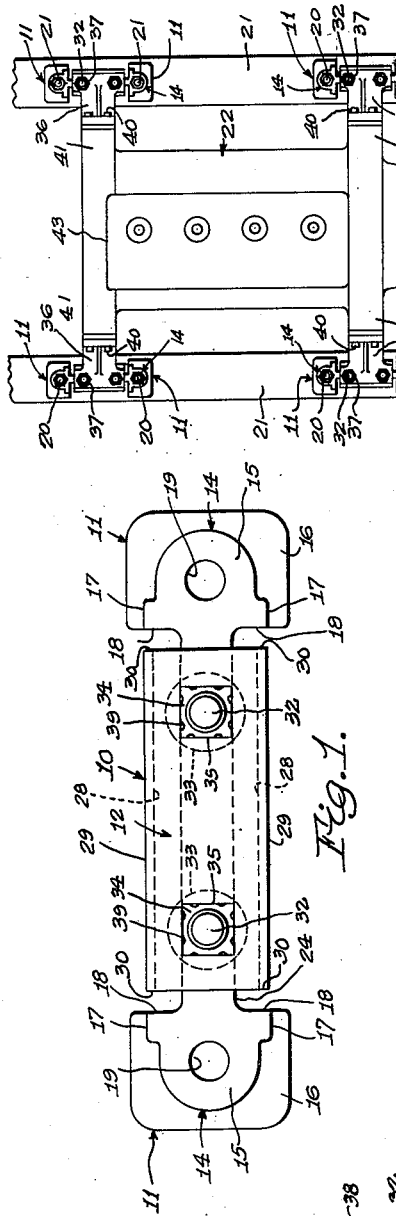
Inventor
Robert W. Fernstrum
by Barthel & Bugbee
Att'ys Patented July 10, 1951

2,560,098

UNITED STATES PATENT OFFICE 2,560,098

CUSHION MOUNTING DEVICE

Robert W. Fernstrum, Detroit, Mich., assignor to Gray Marine Motor Company, Detroit, Mich., a corporation of Michigan Application January 5, 1946, Serial No. 639,304

5 Claims. (Cl. 248—22)

This invention relates to cushion mounting devices having non-metallic resilient material such as natural or synthetic rubber interposed between metallic members so as to interrupt all metallic connection between the connected members.

One object of this invention is to provide a cushion mounting device wherein the rubber or rubber-like material is covered and thereby protected from oil and other deteriorating agents by one of the mounting elements.

Another object is to provide a cushion mounting device wherein the mounting elements are so constructed and arranged as to provide stops for limiting the movement of the elements in the event of failure of the rubber or rubber-like material interposed therebetween.

Another object is to provide a cushion mounting device which is especially valuable in the mounting of engines subject not only to a torque reaction and a static load but also to thrust, such as when the engine is connected to a propeller operating in a gaseous or liquid medium.

Another object is to provide a cushion mounting device for engines subject not only to torque reaction but also to static load and axial or longitudinal thrust, means being provided for restricting axial or longitudinal travel of the engine in the event of the failure of the rubber or rubber-like cushioning material.

Another object is to provide a cushion mounting device as set forth in the preceding objects, wherein the rubber or rubber-like material is in shear at all times, not only for torque reaction and static load but also for axial or longitudinal thrust.

Other objects and advantages of the invention will become apparent during the course of the following description of the accompanying drawing, wherein:

Figure 1 is a top plan view of a cushion mounting device, according to a preferred embodiment of the invention;

Figure 2 is a side elevation, partly in longitudinal section, of the cushion mounting device shown in Figure 1;

Figure 3 is a vertical cross-section along the line 3—3 in Figure 2;

Figure 4 is a diagrammatic top plan view of a marine internal combustion engine supported by a plurality of the cushion mounting devices shown in Figure 1; and Figure 5 is a diagrammatic end elevation of the assembly shown in Figure 4.

Referring to the drawing in detail, Figures 1 and 2 show the cushion mounting device, generally designated 10, as consisting of a base, generally designated 11, and a support, generally designated 12, interconnected by a resilient cushion member, generally designated 13.

The base 11 consists of end portions 14 comprising roughly cylindical bosses 15 having flanges 16 at the bottom thereof, lateral projections 17 forming abutment walls 18 on the inner sides thereof, and holes 19 for the passage of fasteners, such as bolts or screws 20 (Figures 4 and 5) for securing the cushion mounting devices 10 to frame members 21, such as those used for mounting an internal combustion engine 22 in a boat. The bottom surfaces 23 of the end portions 14 and their flanged portions 15 rest upon and are secured to the frame members 21.

The end portions 14 are interconnected by an upstanding bridge portion 24 which is relatively thin in proportion to its height and which has opposite vertical walls 25 to which are securely bonded the opposite vertical portions 26 of a U-shaped resilient member 27, preferably of natural or synthetic rubber.

The outer walls of the resilient member 27 are likewise securely bonded to the inner walls 28 of the flanges of a downwardly facing channel member 29 forming a part of the support 12. The ends 30 of the channel member 29 are spaced away from the abutment surfaces 18 (Figure 1) and the bottom edges 31 are likewise spaced above the bottom surface 23 of the end portions 14, this bottom surface 23 also extending beneath the bridge portion 24 in substantially the same horizontal plane. Fasteners 32, such as screws with heads 33 and shank portions 34, extend upwardly through holes 35 in the web of the channel member 29. These fasteners 32 serve to connect to angle brackets 36, as by nuts 37 threaded upon the threaded portions 38 of the fasteners 32. The holes 35 and shank portions 34 are square in cross-section and fit snugly together so as to prevent rotation of the fasteners 32, and are secured together as at 39 by welding or peening or by indenting such as with a prick punch. The angle brackets 36 are in turn bolted as at 40 (Figure 4) to the projecting portions 41 forming a part of the engine casting 42. The details of the engine 22 are conventional and form no part of the present invention; as usual, however, the engine 22 is provided with a cylinder head 43, a transmission housing 44, usually containing a clutch, and a propeller shaft 45 emerging therefrom. A crank case 46 (Figure 5) is secured to the under side of the engine casting 42 in the usual manner.

The resilient cushion member 13 may have independent side parts 26 or these may be interconnected by a portion 47 bonded to the web of the channel member 29. In the latter case, the portion 47 is provided with holes 48 therethrough for receiving the heads 33 of the fasteners 32. Furthermore, instead of two cushion mounting devices 10 on each side of the engine, three may optionally be used, such as when reduction gearing is incorporated with the engine 22.

In operation, with the cushion mounting devices 10 installed as described above and shown in Figures 4 and 5, the vibration of the engine 22 is effectively cushioned by the resilient layer 27 between the vibrating portion 29 and the bridge portion 24 (Figure 3). At the same time, the longitudinal thrust arising from the propeller on the outer end of the propeller shaft 45 is likewise absorbed by the same cushion layer 27, together with any vibration arising therefrom. Since the cushioning layer 27 comprising the resilient member is in shear not only to torque reaction and static load but also to the thrust of the propeller and propeller shaft 45, the cushioning action is most effective.

In the event, however, of a failure of the bond between the resilient member 27 and either the bridge portion 24 or the channel member 29 or both, the channel member 29 is still held in position by the bridge member 24 and also by engagement with the abutment walls 18 of the projections 17 on the bosses 15, despite the thrust of the propeller and propeller shaft 45. Thus, the failure of the cushioning element 27 does not release the engine 22 but holds the latter substantially in proper alignment until repairs can be effected. Moreover, the downwardly extending arrangement of the channel member 29 also has the effect of a protecting hood which covers and shields the resilient member 27 from flying lubricating oil or gasoline or, in the case of a Diesel engine, from Diesel oil. Thus, if natural rubber is employed for the resilient member 27, it is effectively protected from deteriorating oils and greases by the hood-like shape of the inverted channel member 29, and its life is accordingly prolonged. Such oils and greases are particularly detrimental to the bond between the rubber or rubber-like material and the metal surfaces to which it is bonded and the present invention prevents or greatly reduces the damaging effect of such oils and greases upon the bond.

While I have shown and described my invention in detail, it is to be understood that the same is to be limited only by the appended claims, for many changes may be made without departing from the spirit and scope of my invention.

What I claim is:

1. A cushion mounting device for articles to be resiliently supported comprising a support having an upstanding member, an inverted approximately U-shaped channel member having its flanges extending downwardly on opposite sides of said upstanding member with its web extending thereover, means on said channel member for connecting the supported article thereto, and an inverted approximately U-shaped member of resilient material disposed between and bonded to the facing surfaces of said members and extending over the top of said upstanding member, and a stop member on said support disposed longitudinally of said channel member in spaced relationship therewith.

2. A cushion mounting device for articles to be resiliently supported comprising a support having an upstanding member, an inverted approximately U-shaped channel member having its flanges extending downwardly on opposite sides of said upstanding member with its web extending thereover, means on said channel member for connecting the supported article thereto, and an inverted approximately U-shaped member of resilient material disposed between and bonded to the facing surfaces of said members and extending over the top of said upstanding member, and a stop member on said support disposed longitudinally of said channel member at the opposite ends thereof and in spaced relationship therewith.

3. A cushion mounting device for articles to be resiliently supported comprising an elongated support having mounting bosses at opposite ends thereof and a relatively narrower upstanding bridge member connecting said bosses, a downwardly facing channel member arranged with its flanges disposed on opposite sides of said bridge member and its web extending thereover, means on said channel member for connecting the supported article thereto, and resilient material disposed between and bonded to the facing surfaces of said members.

4. A cushion mounting device for articles to be resiliently supported comprising an elongated support having mounting bosses at opposite ends thereof and a relatively narrower upstanding bridge member connecting said bosses, a downwardly facing channel member arranged with its finages disposed on opposite sides of said bridge member and its web extending thereover, means on said channel member for connecting the supported article thereto, and resilient material disposed between and bonded to the facing surfaces of said members, one of said bosses having an abutment portion aligned with and spaced apart from one end of said channel member.

5. A cushion mounting device for articles to be resiliently supported comprising an elongated support having mounting bosses at opposite ends thereof and a relatively narrower upstanding bridge member connecting said bosses, a downwardly facing approximately U-shaped channel member arranged with its flanges disposed on opposite sides of said bridge member and its web extending thereover, means on said channel member for connecting the supported article thereto, and an inverted approximately U-shaped member of resilient material disposed between and bonded to the facing surfaces of said members, said resilient member having a top portion extending over the top of said bridge member and bonded to said channel member.

ROBERT W. FERNSTRUM.

REFERENCES CITED

The following references are of record in the file of this patent:

UNITED STATES PATENTS

| Number | Name | Date |
|---|---|---|
| 2,252,938 | Lord | Aug. 19, 1941 |
| 2,406,601 | Tyler | Aug. 27, 1946 |